(No Model.)
C. THUENER.
TABLE FOR MITERING AND JOINING MOLDINGS, &c.
No. 500,042. Patented June 20, 1893.
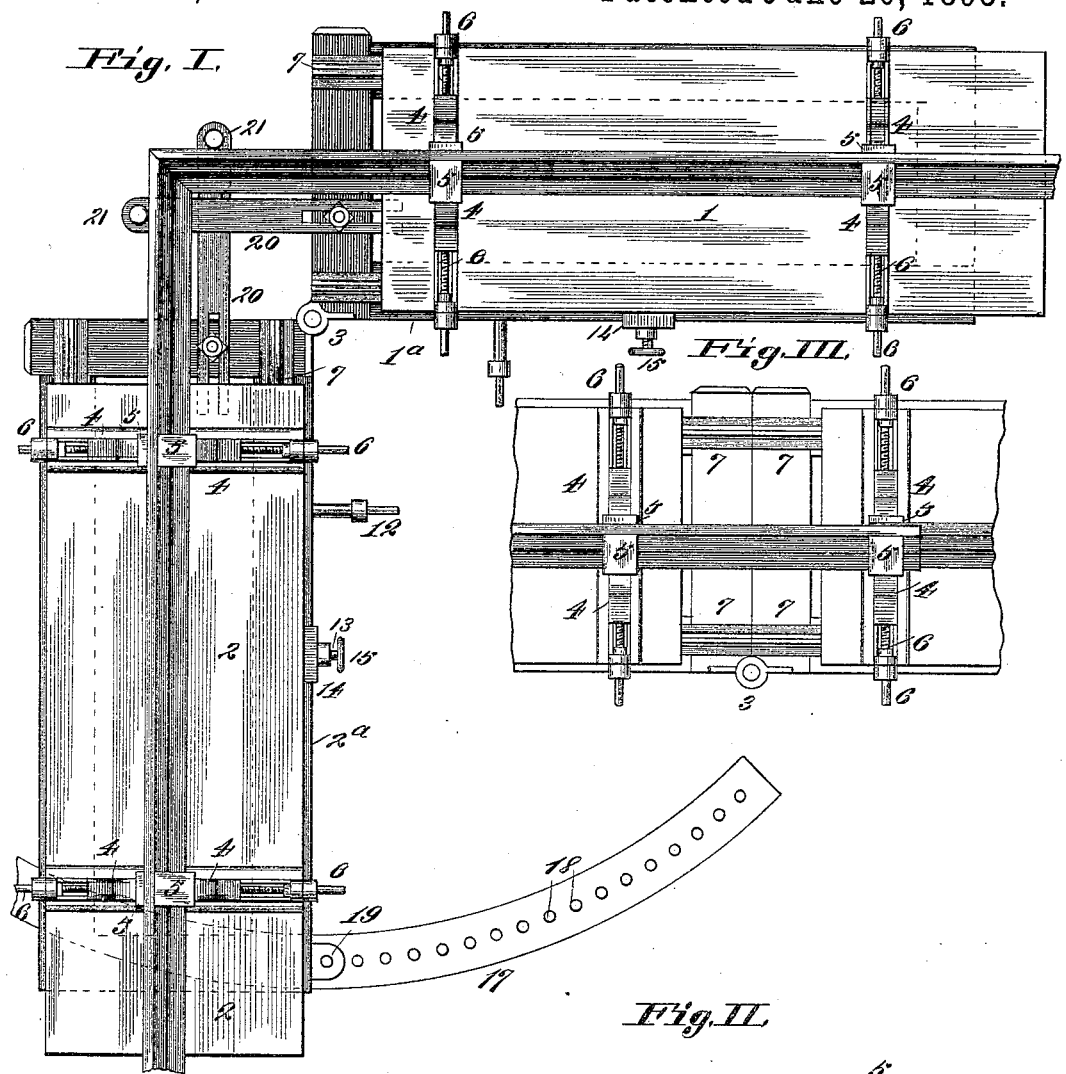
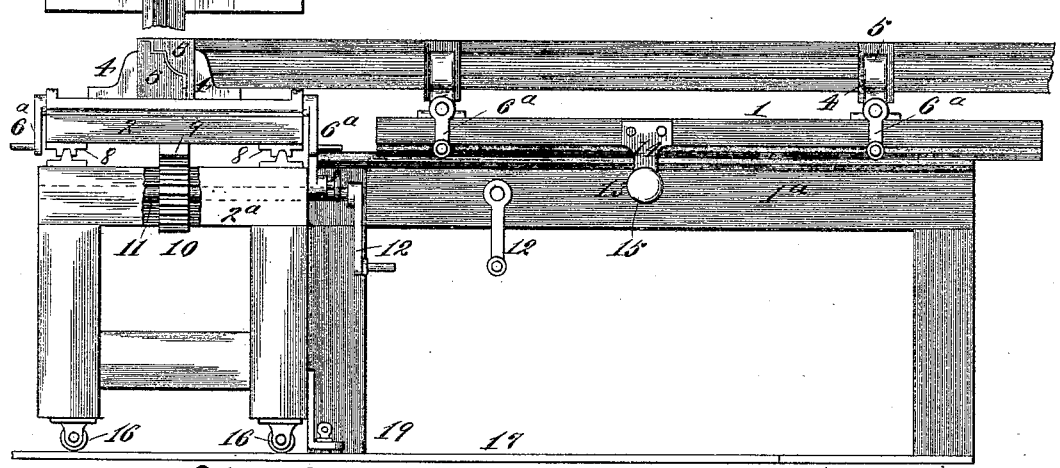
Attest: W. E. Allen, Edward P. Knight.
Inventor: Charles Thuener by Knight Bro. atty's
THE NORRIS PETERS CO., PHOTO-LITHO., WASHINGTON, D. C.

UNITED STATES PATENT OFFICE.

CHARLES THUENER, OF ST. LOUIS, MISSOURI.

TABLE FOR MITERING AND JOINING MOLDINGS, &c.

SPECIFICATION forming part of Letters Patent No. 500,042, dated June 20, 1893.

Application filed December 7, 1892. Serial No. 454,378. (No model.)

*To all whom it may concern:*

Be it known that I, CHARLES THUENER, of the city of St. Louis, in the State of Missouri, have invented a certain new and useful Improvement in Tables for Mitering and Joining Moldings, Cornices, &c., of which the following is a full, clear, and exact description, reference being had to the accompanying drawings, forming part of this specification.

My invention relates to an improved table or apparatus for mitering and joining cornices, moldings and the like; and my invention consists in features of novelty hereinafter fully described and pointed out in the claims.

Figure I is a top or plan view, showing the table in position for forming a right angle or square miter. Fig. II is an elevation of same. Fig. III is a detail view, showing the table in position for joining a straight piece of cornice or molding.

Referring to the drawings, 1 represents one of the sections of the table, and 2 the other section. These sections are mounted on bases 1ª, 2ª, which are connected by a rule joint 3. I prefer to make the section 1 stationary, and the section 2 movable, but it is evident that, if preferred, both sections may be movable. Each section is provided with one or more clamps 4 for holding the piece of molding or cornice to be mitered or joined. I have shown each clamp consisting of two jaws 5, held in suitable slides or ways in the table, and which are adapted to be adjusted by suitable set screws 6, provided with cranks 6ª for moving them. The faces of the jaws and clamps would be formed to suit the shape or cross section of the molding or cornice, so that when the molding or cornice is placed on the table between the jaws and the jaws are set up by means of the set screws, they will fit all parts of the molding or cornice. The bases 1ª, 2ª, are provided with rails or tracks 7, on which fit grooved plates 8, secured to the under side of the table.

On the under side, preferably at the middle of each section of the table, there is a rack 9 engaged by a pinion 10, on a shaft 11, journaled in the base; the shaft having a crank 12 by which it may be turned, and thus the tables are moved endwise on their base or supports, and when adjusted to the proper position are held, or may be held, by suitable clamps 13; each clamp consisting of an arm 14 depending from the table and a set screw 15 passing through the arm and screwing into or against the side of the base or support.

The movable section 2 of the table, I prefer to mount on rollers 16, (see Fig. II,) which travel on a track 17 provided with perforations 18 to receive a pin 19 secured to the table, so that when the section 2 is adjusted to the desired position with relation to the section 1, it can be clamped and held to its adjustment.

Now supposing that a right angle or square miter is to be formed between two pieces of molding or cornices, the table is adjusted with one section at right angles to the other, as shown in Figs. I and II. The pieces of molding or cornice are then placed on the respective tables, between the clamps, and the jaws of the clamps set, or moved together, so as to grip and hold the sections or pieces of molding or cornice. The tables are then moved by means of the racks 9, to bring the two ends of the molding or cornice together, as shown in Fig. I, where they are held until the joint is made. To prevent danger of the molding or cornice being sprung by the sections of the table being moved a little too far, I secure to each base a plate 20 having a pin 21, which projects upwardly, and fits against the back of the molding of the cornice, and prevents the molding or cornice being sprung out of shape, as stated. If the angle at which the moldings or cornice is to be joined, is some other than a right angle, the section 2 of the table is moved, with relation to the section 1, to correspond to that angle, and then the operation is proceeded with, as already explained. In this manner a perfect joint, with any desired angle, can be made, and the parts are held firmly in place, while the joint is being riveted or soldered, as the case may be, and by the use of an apparatus of this kind, an inexperienced person can form a joint, with as much or greater accuracy than an experienced person can with the old method; and it is evident that the operation can be more quickly done, and that one man can do the work of two or more men, with the old method, and in much less time.

If two pieces or sections of molding or cornice are to be joined in a straight length, the two parts of the table are brought together, end to end, as shown in Fig. III. The molding or cornice is then placed on the table with one section slightly lapping over the other section, and the clamps are then set up, and the rivets or solder can be applied at the point of lap.

In forming a straight joint, by the use of this machine, it is obvious that the old and tedious operation of sighting the sections to get them in line is obviated.

I claim as my invention—

1. An apparatus for mitering and joining moldings, constructed with a base in two sections hinged together, so as to be capable of relative angular adjustment, a sliding table on each of said base sections, and clamps carried by said tables; substantially as herein described.

2. The combination of the fixed base 1ª, the base 2ª hinged to the said fixed base and adjustable in angle with relation thereto, the sliding tables 1 and 2 mounted on the respective bases 1ª, 2ª and clamps 4 carried by said tables, substantially as described.

3. The combination of the base 1ª, the sliding table 1 mounted thereon, the adjustable base 2ª connected by hinges 3 to the base 1ª, the sliding table 2 on said adjustable base, clamps 4 carried by the said sliding tables 1, 2, a segment rack 17, 18, and means for securing the free end of the adjustable base thereto, whereby the clamp table 2 carried by the adjustable base 2ª is held in any desired angular adjustment relatively to the table 1, as explained.

4. The combination of the base sections 1ª, 2ª, hinged together, the sliding tables 1, 2, carried thereby and having clamps 4, means for securing said base sections and their tables in any desired angular adjustment and racks 9 engaged by pinions 10, for sliding the tables to bring the ends of the molding sections together, substantially as described.

5. In an apparatus for joining and mitering moldings and cornices, the combination of a table formed in two sections, clamps mounted on each section, means for moving the sections on their bases, and the plates 20, provided with pins 21; projecting from the adjacent ends of said table sections to engage the molding substantially as and for the purpose set forth.

CHAS. THUENER.

In presence of—
  ALBERT M. EBERSOLE,
  ED. S. KNIGHT.